United States Patent [19]

Rhodes

[11] 4,095,426
[45] Jun. 20, 1978

[54] TURBINE AND METHOD OF USING SAME

[76] Inventor: William A. Rhodes, 4421 N. 13th Pl., Phoenix, Ariz. 85016

[21] Appl. No.: 718,393

[22] Filed: Aug. 27, 1976

[51] Int. Cl.² .............................................. F03G 7/00
[52] U.S. Cl. ..................................... 60/496; 64/28 M
[58] Field of Search ................. 60/495, 496; 64/28 M; 417/5, 7

[56] References Cited

U.S. PATENT DOCUMENTS

| 144,883 | 11/1873 | Beekman | 60/496 |
| 196,038 | 10/1877 | Partz | 60/496 |
| 211,143 | 1/1879 | Fogarty | 60/496 |
| 650,063 | 5/1900 | Kersten | 60/496 |

FOREIGN PATENT DOCUMENTS 2,255,097  11/1971  Germany ............................ 60/496

Primary Examiner—Allen M. Ostrager
Attorney, Agent, or Firm—Don J. Flickinger; John A. Robertson

[57] ABSTRACT

The disclosure relates to a turbine having a rotor rotatable on a generally horizontal axis; the rotor being emersed in liquid and being driven upward by rising gasses on an ascending portion of the rotor and also being driven by downward falling liquid within the descending portion of the rotor and the rotor being constructed in such a manner as to provide substantial liquid sealing between the rotor and arcuate housing seal structure and walls, thereby minimizing blow-by or detour of the gasses around the rotor; the housing in its lower portion having a gas inlet and the housing in its upper portion having a gas liquid condenser and the housing being provided with means for maintaining a constant liquid level therein above said rotor.

5 Claims, 6 Drawing Figures

U.S. Patent June 20, 1978 Sheet 1 of 3 4,095,426
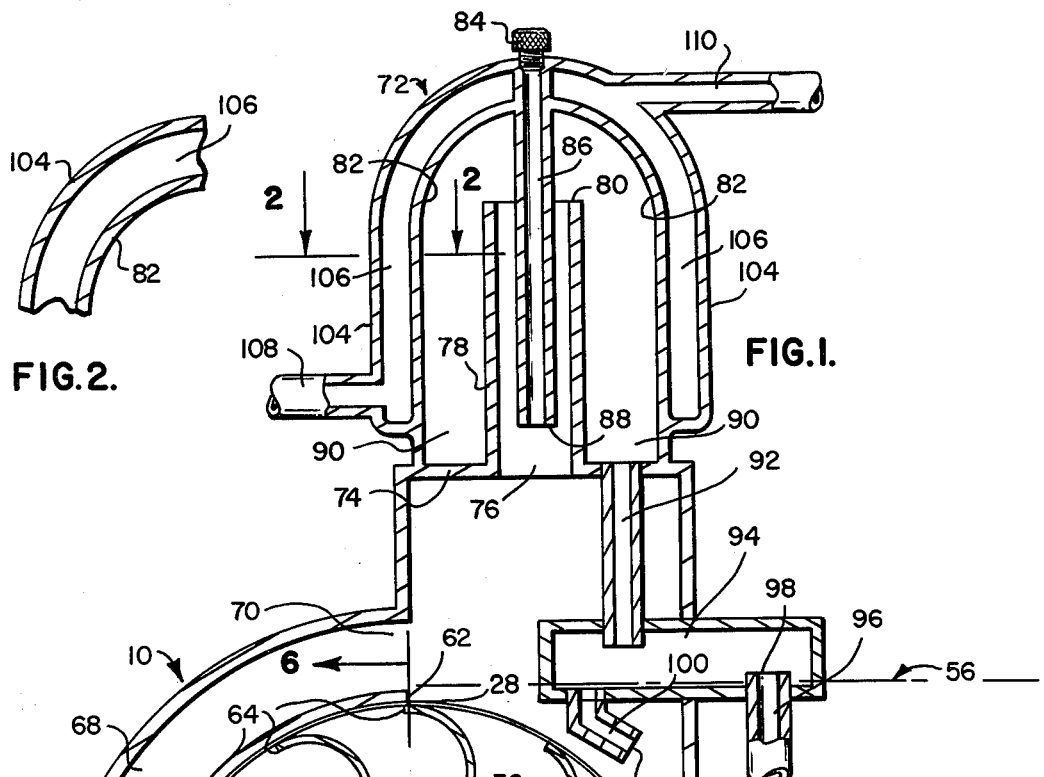
FIG.1.
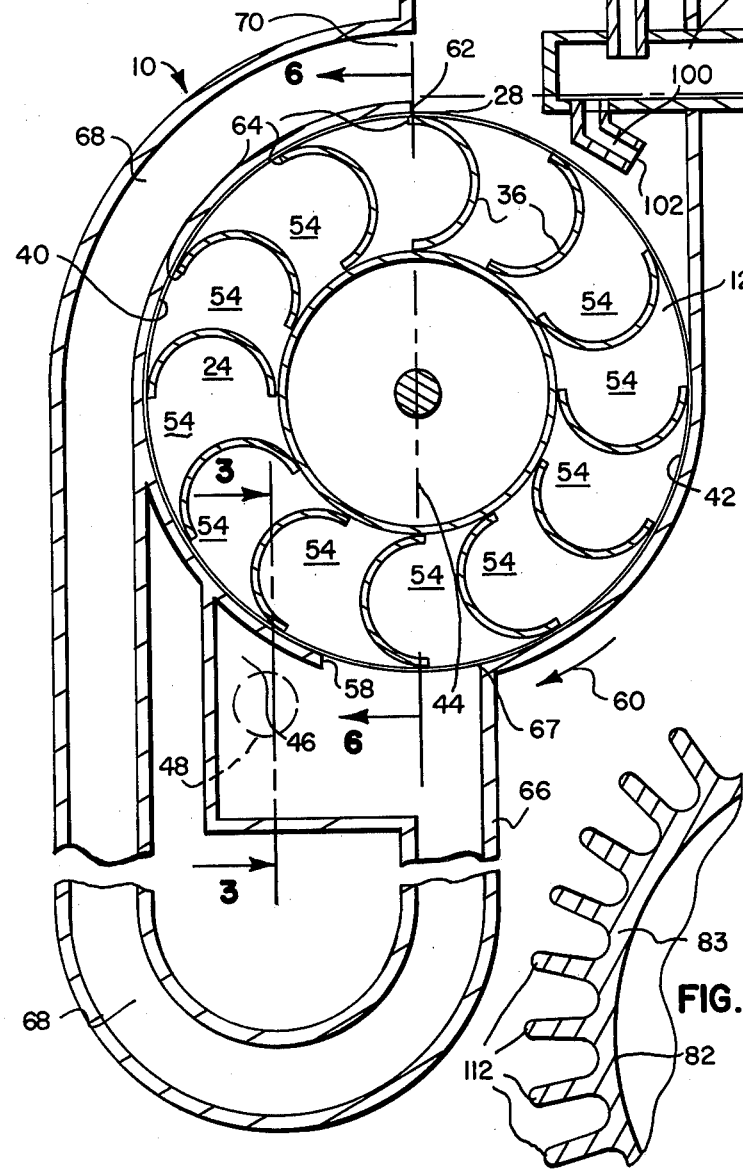
FIG.2.
FIG.3.
FIG.4.
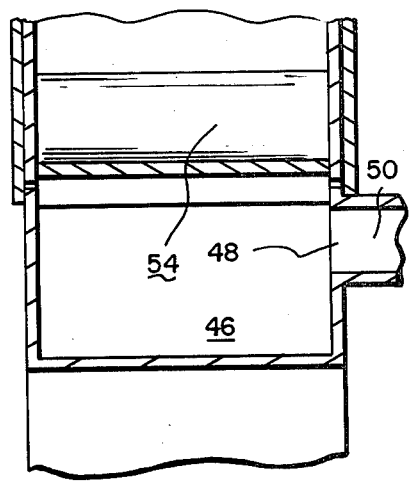

TURBINE AND METHOD OF USING SAME

BACKGROUND OF THE INVENTION

It has been desirable to provide an economically operable turbine or motor to provide motive power for various devices, appliances and other uses. Particularly, it has been desirable to provide a turbine or other motor which is capable of operating efficiently with relation to fluids heated by solar energy.

While various attempts have been made to provide such a turbine or motor, the prior art has not developed such a motor having substantial torque characteristics and simplicity of design which will operate properly in a closed cycle system and be of durable construction.

SUMMARY OF THE INVENTION

The invention comprises a turbine engine having a housing wherein a turbine rotor is emersed in liquid with means to maintain a liquid level above the rotor and wherein a gas inlet is disposed below the rotor in the housing at one side laterally relative to the horizontal axis on which the rotor is mounted, so that gas may pass upwardly into pockets in the rotor and exhaust through the liquid level and pass upwardly into a condenser in the upper portion of the housing which condenses the gas back to a liquid. At the same time, while the gas is bouyantly creating a torque reaction of the rotor, downflowing liquid is gravitating into the pockets of the rotor and tending to rotate it downwardly on the opposite side of the axis from said inlet and whereby the liquid downflowing in one portion of the wheel is in communication with a circulating tube which returns the liquid to a portion of the housing above the rotor and near the liquid level in the housing.

Additionally, a boiler is disposed to receive solar energy and to heat some of said liquid therein to create a gas phase thereof in communication with the interior of said housing below said rotor and below said upwardly moving gas phase in said rotor. The boiler receiving some of said liquid from a liquid level control device, which carries liquid in excess of the liquid level into a reservoir and returns it to the lower portion of the boiler. Thus, the boiler is continuously fed condensed liquid which is condensed in a condenser above the liquid level in the upper portiOn of the housing.

The rotor of the invention is provided with a pair of axially spaced apart disc portions with pockets therebetween communicating with the periphery of the disc portions and the disc portions run adjacent opposite walls of the housing in a rotary fashion, so as to provide a substantial seal between the pockets and an arcuate seal portion of the housing, which is offset over the periphery of the rotor at the aforementioned disc portions. Thus, the gas entering the pocket at the lower portion of the rotor, is effectively sealed into the pocket thereof and thus provides a bouyant torque reaction on said rotor, as compared to the liquid in the downflow portion of the rotor at the opposite side of the rotor axis.

The invention also comprises a novel baffle and conduit means between the upper surface of the liquid in the housing and the condenser so as to prevent rising gas bubbles from causing liquid to be splashed onto the heat exchange surfaces of the condenser; the condenser being capable of exchanging heat to a liquid jacket or to fins cooled by ambient atmosphere.

The liquid level control means in the housing communicates with the condenser through the aforementioned baffle means and the liquid level control means is preferably provided with an overflow tube which maintains a constant liquid level in the housing above the rotor and the overflow tube preferably communicates with a reservoir which feeds the solar heater of the invention, which converts the liquid to a gas phase for introducing the gas into the housing and to provide for bouyant upflow into the turbine rotor pockets for bouyantly creating torque relative to the rotor and the shaft on which it is mounted.

In order to provide an efficient seal to maintain liquid in the housing, the shaft of the rotor is provided with a driving magnet which is disposed in close proximity to a second magnet carried by a second output shaft and a diaphram seal is disposed between the magnet so that there is no rubbing seal with which the liquid in the housing may contact.

The preferred fluid for use in the engine of the invention is dichloromethane having a molecular weight of 84.94 which corresponds with a density of 1.33 which is heavier than water, and the boiling point of this liquid is between 40 and 41 degrees Centegrade.

Accordingly, the preferred liquid for use in the housing and the liquid in which the rotor is emersed has a greater density than water and has a much lower boiling point especially adapted for use in relation to solar energy radiation.

Accordingly, it is an object of the invention to provide a very simple turbine engine which will operate efficiently using a solar energy source and which will provide substantial torque and a reliable mode of operation.

Another object of the invention is to provide a gas phase turbine having a liquid sealed rotor which operates in a housing such as to permit gas to ascend in one portion of the rotor and liquid to descend in the other portion of the rotor, thereby providing substantial torque for driving the rotor shaft.

Another object of the invention is to provide a novel gas phase turbine engine having a housing with a rotor therein and wherein a liquid level is maintained above the rotor so as to maintain it in emersed condition whereby gas ascending in one portion of the rotor is accompanied by liquid descending in the other portion of the rotor and whereby the liquid descending in the housing and rotor is transferred to another portion of the housing at a level above the rotor; the housing being provided with a condenser above the liquid level therein and provided with means for maintaining the liquid level constant and overflowing liquid from the condenser, which is in excess of the liquid level and conducting the overflow liquid to a solar energy heated boiler which delivers gas to the area in which the gas ascends through the pockets and the rotor plates.

Another object of the invention is to provide a turbine which will operate efficiently with a liquid having a low boiling temperature compatible with solar energy and such that a gas phase of the liquid will bouyantly migrate through one portion of the rotor while the liquid gravitates downwardly through another portion of the rotor to provide substantial torque and wherein the density of the liquid is substantially great, thereby affording good torque characteristics during the operation of the rotor.

Another object of the invention is to provide a novel liquid seal and magnetic drive relative to the housing and the output shaft of the turbine motor of the invention.

Further objects and advantages of the invention may be apparent from the following specification, appended claims and accompanying drawings.

BRIEF DESCRIPTION OF THE DRAWINGS

FIG. 1 is a vertical sectional view through the turbine engine of the invention taken on a plane at right angles to the axis of the rotor therein;

FIG. 2 is a fragmentary sectional view of the condenser of the engine taken from line 2—2 of FIG. 1;

FIG. 3 is a fragmentary sectional view of the gas inlet at the lower portion of the rotor of the turbine of the invention taken from the line 3—3 of FIG. 1;

FIG. 4 is a view similar to FIG. 2 but showing a modification of the condenser of the invention;

DESCRIPTION OF THE PREFERRED EMBODIMENTS

Figure 6:
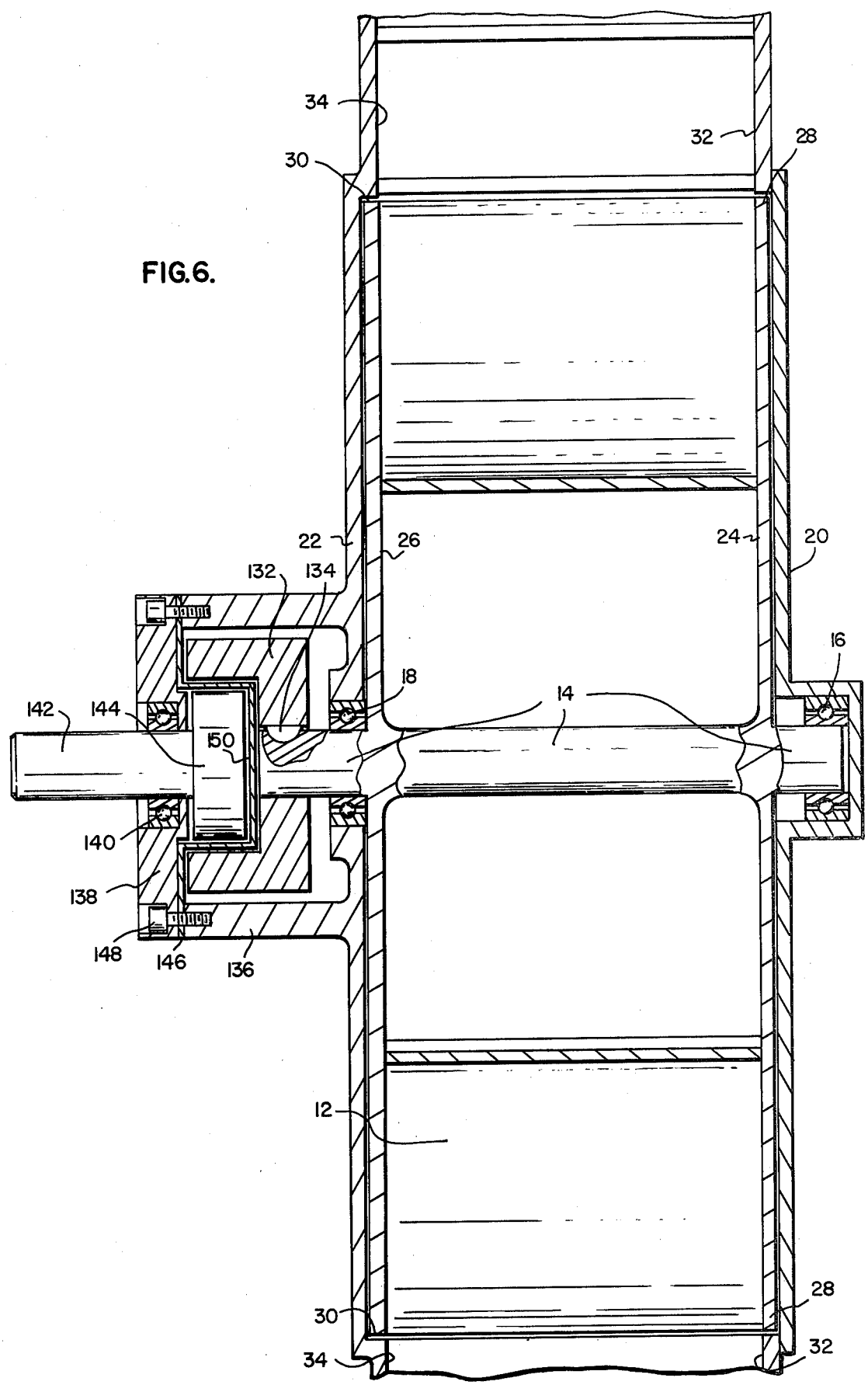
FIG. 6 is a fragmentary sectional view taken from the line 6—6 of FIG. 1, showing the structure of the invention on an enlarged scale.

As shown in FIG. 1 of the drawings, the turbine engine of the invention is provided with a housing 10 wherein a rotor 12 is rotated upon a substantially horizontal axis of a shaft 14 carried by bearings 16 and 18 shown in FIG. 6 of the drawings. The housing, as shown in FIG. 6, is provided with opposite wall portions 20 and 22 which are disposed in close proximity to respective disc portions 24 and 26 of the rotor 12.

The discs 24 and 26 are provided with slight clearance relative to the inner surfaces of the walls 20 and 22 and the peripheral portions 28 and 30 of the disc portions 24 and 26 are recessed relative to inwardly offset portions 32 and 34 of the housing walls 20 and 22, all as shown in FIG. 6 of the drawings. This offset relation of the wall portions 32 and 34 overlying the peripheries 28 and 30 of the disc portions 24 and 26 respectively provides for a substantial liquid seal around the gasses phase of fluids which operate the rotor as will be hereinafter described in detail.

As shown in FIG. 1 of the drawings, the rotor is provided with arcuately shaped blades 36 which are coextensive with the space in the disc portions 24 and 26 to form pockets in the rotor between the discs 24 and 26 and communicating with the peripheries 28 and 30 of the disc portions 24 and 26. It will be noted that the rotor is provided with a hollow cylindrical hub 38, which is concentric with the shaft 14 and spaced therefrom and this hub 38 is spaced from the peripheries 28 and 30 such as to accomodate the blades 36 between the peripheries and the hub 38 and to thereby define in connection with the blades 36 pockets communicating with the periphery of the rotor, which is coincident with the peripheries 28 and 30, hereinbefore described. It will be seen that the arcuate blades 36 are substantially semi-circular and are all concaval convex and arranged in a direction wherein the concave sides are directed in a counter-clockwise direction and the convex sides of the blades 36 are directed in a clock-wise direction.

The housing is provided with arcuate wall structure 40 at one side of the central axis of the shaft 14 and is provided with additional arcuate wall structure 42 at the opposite side of the axis of the shaft 14 such that these wall structures 40 and 42 form a gas liquid seal with the periphery of the rotor 12 at the open pockets between the blades 36 and the disc portions 24 and 26 hereinbefore described.

Figure 5:
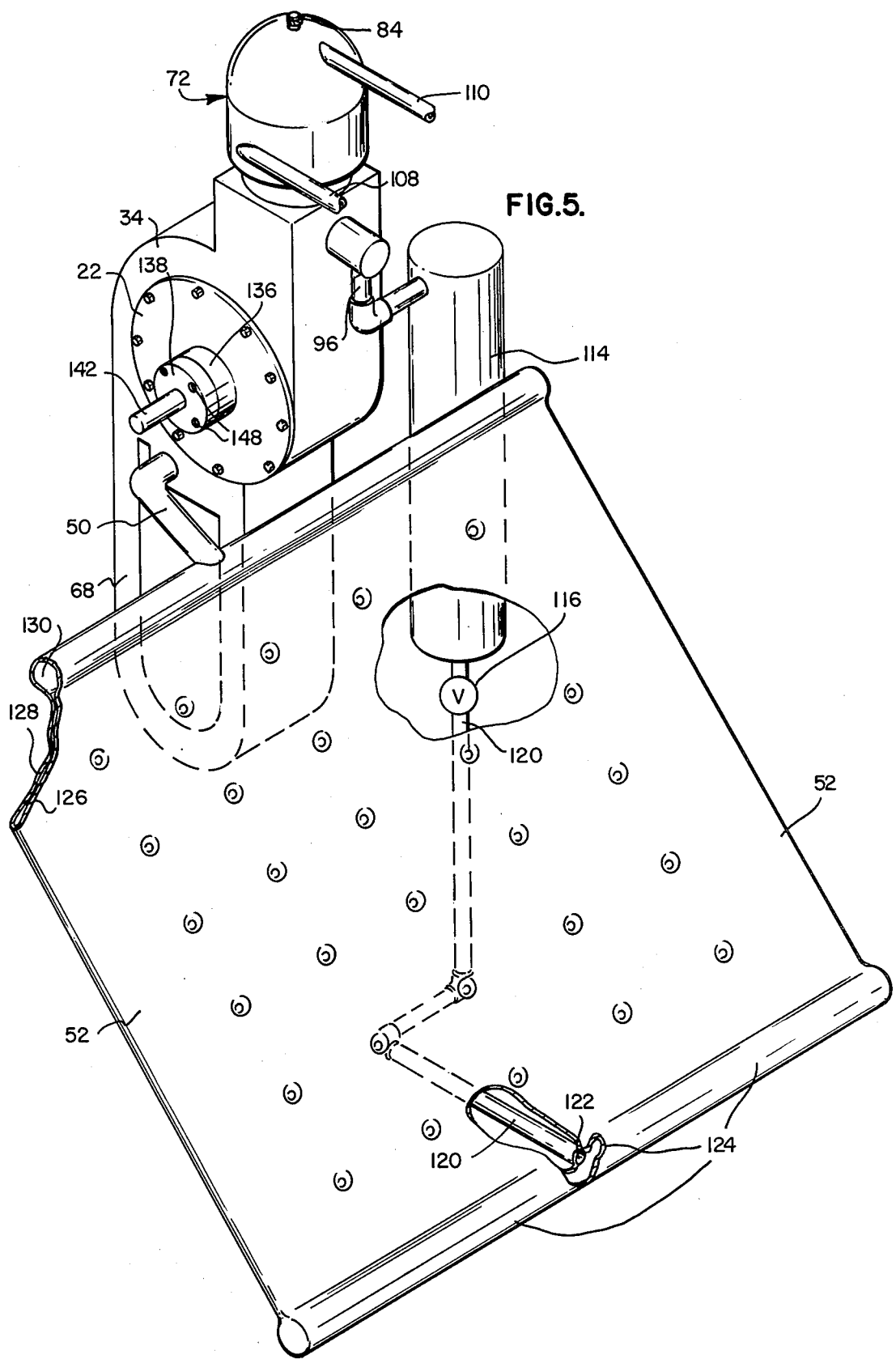
FIG. 5 is a perspective view of the gas phase turbine engine together with a solar radiation receiving boiler in connection therewith.

The axis of the shaft 14 is generally horizontal and in FIG. 1 this axis is designated 44. The housing 10 in a lower portion thereof is provided with a gas inlet chamber 46 having an inlet opening 48 communicating therewith; the opening 48 being in communicated relation with a conduit 50 which communicates with a solar heat collector or boiler 52 which is shown in FIG. 5 and which will be hereinafter described in detail.

It will be seen that the gas inlet chamber 46 communicates with pockets 54 between the blades 36 at a lower peripheral portion of the rotor 12.

The housing 14 contains liquid which stands approximately at a level designated 56, which is above the rotor 12 leaving the rotor emersed in said liquid; the preferred liquid being dichloromethane. However, other liquids may be suitable as will be hereinafter described.

The housing at the gas inlet chamber 46 is provided with a lip 58 which is a lower terminus of the arcuate wall 40 adjacent to which gasses ascend in the pockets 54 and create bouant torque on the rotor 12.

It will be seen that gas may enter the chamber 46 and pass readily upward into the pockets 54 at one side of the rotor axis 44 and laterally thereof while some of the gas displaces liquid from a pocket 54, which is passing toward the chamber 46 in the direction of an arrow 60 in FIG. 1 of the drawings.

The upper portion of the arcuate wall 40 is provided with a terminus designated 62 and gas escapes from the pockets 54 progressively as each edge 64 of each blade 36 moves past the edge 62 in the direction of the arrow 60. This permits gas to rise through the liquid above the level 56 and pass upwardly therefrom.

It will be seen that the arcuate wall 40 is coupled to a downwardly directed duct 66 which is provided with a deep loop 68 extending a considerable distance below the rotor 12. Thus, a conduit is provided which conducts the downflowing liquid adjacent the arcuate wall 42 in the pockets 54 of the rotor and this liquid, as hereinbefore described, is relieved from each pocket progressively as some of the gas enters the respective pocket and allows the liquid to fall out and downwardly through the conduit 68 which fills up to substantially the level 56 and thus, the liquid gradually progresses through the conduit 68 to an outlet area 70 above the exhaust edge 62 of the arcuate wall 40 at which the gas emanates upwardly through the liquid to a position above its level from the pockets 54 in the turbine rotor 12.

An upper part of the housing 12 comprises a condenser 72 and this condenser 72 is adapted to condense the gasses which rise through the liquid at the level 56 from the pockets 54 of the rotor 12. The housing is provided with a horizontal baffle 74 which is above the liquid level 56 and this baffle has a central opening 76 communicating with an upstanding tube 78 having an upper open end 80 which communicates with the interior heat exchange walls 82 of the condenser 72. This condenser 72 is generally dome shaped and provided with a hermetically sealing filler plug 84 which communicates with a downwardly extending filler tube 86 having a terminus or open end 88 within the upstanding tube or conduit 78.

The baffle 74 and conduit 78, together with the tube 88, prevent liquid which splashes up the surfaces 56 from splashing upwardly and directly contacting the heat exchange surfaces 82 of the condenser 72.

The upstanding tube 78 provides for an annular sump 90 surrounding the tube 78 and above baffles 74.

Communicating with the sump 90 is a tubular conduit 92 which drains condensate into a liquid level control chamber 94 having a conduit 96 provided with an upper overflow open end 98 which establishes the liquid level 56.

It will be appreciated that in lieu of the overflow open end 98 of the tubular conduit 96, that a float valve may be used if desired.

In the lower portion of the liquid level control housing 94 is a conduit 100 which communicates with the liquid below the level 56 and this conduit 100 is directed in a direction into the liquid away from the edge 62 of the arcuate wall 40 so that gas bubbles may not enter the conduit 100 at its open end 102 below the liquid level 56.

As shown in FIGS. 1 and 2, the condenser 72 is provided with an outer wall 104 surrounding the inner condenser wall 82 to provide a space 106 between the walls 82 and 104; the space 106 being adapted to receive a coolant fluid via a conduit 108 and to exhaust heated fluid via a conduit 110 to any suitable liquid cooling means. This liquid cooling may be provided by any source of liquid, such as cold water, which may be readily available.

As a modification of the invention, the structure shown in FIG. 4, comprises an inner heat exchange wall surface 82 with a wall 83 and integral heat exchange fins 112 projecting from the exterior of the wall 83 and being subject to contact by air flow for exchanging heat to the ambient atmosphere. Thus, the condenser wall 82 is capable of being cooled to a sufficient degree to condense the dichloromethane vapors or gasses which enter the condenser 72 through the interior of the tubes 78, as hereinbefore described.

As shown in FIG. 5 of the drawings, the overflow tube 96 communicates with the interior of a hollow cylindrical liquid receiver 114 which is provided with an outlet control valve 116 at its lower end which controls the flow of liquid from the receiver 114 outwardly into a conduit 120 having a outlet end 122 communicating within a hollow manifold portion 124 in a lower portion of the solar heat collector or boiler 52. It will be appreciated that the receiver 114 only receives liquid which is in excess of the level 56 and which drains through the overflow open end 98 of the overflow tube 96.

The solar heat collector or boiler 52 is provided with opposed spaced apart walls 126 and 128 which communicate with the manifold 124 which is a generally hollow cylindrical manifold and these opposed walls 126 and 128 also communicate with a hollow cylindrical outlet or gas receiving manifold 130 which communicates with the gas conducting tube 50 as hereinbefore described in connection with FIGS. 1 and 3 of the drawings, which delivers gas to the opening 48 at the inlet to the gas receiving chamber 46 hereinbefore described in connection with FIGS. 1 and 3 of the drawings.

As shown in FIG. 6 of the drawings, the shaft 14 is coupled to a generally cup shaped magnet 132 by means of a conventional woodruff key 134.

The housing wall 22 is provided with an integral hollow cylindrical portion 136 having a bearing supporting cap 138 in which a bearing 140 supports a power output shaft 142 and fixed to the shaft 142 is a generally disc shaped magnet 144 which is surrounded by the generally cup shaped magnet 132 on the shaft 14.

Disposed between the cap 138 and the housing portion 136 is a diaphram seal 146 which is clamped between the cap 138 and the housing portion 136 by means of bolts 148, thus hermetically sealing the peripheral portion of the diaphram seal 146 relative to the housing 12 at its interior and relative to the liquid contained therein.

The diaphram seal 146 is provided with a cup shaped portion 150 which extends between the magnets 132 and 144. This diaphram seal 146 is preferably made of stainless steel or other solvent resistive pressure type material which can be disposed in stationary position while the magnets 132 and 144 rotate in unison. The magnet 132 being capable of magnetically attractively rotating the magnet 144 and the shaft 142 which in turn may be used as a power output shaft to drive any suitable appliance or what ever is desired.

Mixed with the dichloromethane liquid in the housing is approximately one to two percent of refrigeration oil, which lubricates the bearings 16 and 18 and other bearing surfaces in the engine of the invention.

The liquid is charged into the housing 10 as follows:

The plug is removed and the charge of liquid is introduced through the fill tube 86 and into the interior of the housing up to the liquid level 56 which may be detected by a suitable sight glass in the side of the housing 10 which is not disclosed but which is no part of my present invention.

When the total liquid level of the dichloromethane and oil is at the level 56, the housing may be evacuated of all air therein by applying vacuum at the upper end of the fill tube 86 by means of a suitable fixture which may be substituted for the plug 84 such as a fixture normally used in connection with the charging of refrigerant systems.

The vacuum is applied until the dichloromethane boils and as it reaches its boiling point and vapors are withdrawn through the tube 86, it will be apparent that all of the air is previously withdrawn from the housing, since dichloromethane vapor is heavier than atmospheric gasses and this method has been very successful in the charging and properly loading the housing with dichloromethane and removing all foreign gasses or vapors. When the atmospheric gasses are completely removed the plug and valve system normally used is closed, thereby hermetically sealing the dichloromethane in the housing 10. It will be noted that the housing may be heated until the dichloromethane vapor is apparent and this will also indicate that the atmosphere has been driven off, since it is in the upper strata of the housing due to the fact that the dichloromethane vapors are heavier than air.

With the liquid level substantially at 56, as shown in FIG. 1, it is above the lip 62 of the liquid return conduit 68. Under this condition, the static liquid level provides for a minimum of energy in returning liquid from the rotor pocket 54 through the conduit 68 and back to the interior of the housing 10 above the wheel or rotor 12. With the liquid level at 56, the gravitational fall or gravitational phenomenon in the pockets 54 causes a heavy downward thrust in the pockets 54 until they reach the area of the outlet portion 67 adjacent to the gas inlet chamber 46. At the same time, bouyant gas is moving upward in the pockets 54 as the turbine rotor 12 rotates in a generally clockwise direction as indicated by the arrow 60 in FIG. 1. Thus, liquid travels downward on the righthand side of the axis 44, as shown in FIG. 1, while gas bouyantly moves upward in the pockets 54 on the left side of the axis 44, as shown in FIG. 1 and thus providing a great torque producing differential which rotates the shaft 14 forcefully and affords a substantial amount of torque power available at the output shaft 142. It will be seen, therefore, that there is a substantially hydrostatic balance provided by the liquid level 56 which is above the rotor 12 and communicating with the outlet of the conduit 68 above the lip 62, as shown in FIG. 1 of the drawings.

As the gasses pass upward in the pockets 54 and are expelled adjacent the lip 62, the gasses move upward toward the baffle 74 and at times may cause splashing which the baffle 74 stops. The gasses pass on upward through the inlet end of the conduit 78 and out of the open end 80 and into communication with the heat exchange surfaces 82 of the condenser 72.

The heat exchange surfaces 82 are cool enough to condense the dichloromethane gas back to liquid which gravitates to the sump 90 and downward through the tube 92 to the liquid level control chamber 94 and excess liquid over and above the level 56 pass outwardly through the overflow opening 98 of the overflow tube 96. The tube 92 at its open end 102 is below the level 56 and directed away from the lip area 62 so that gas bubbles do not enter the tube 100 and disrupt the tranquility of the liquid in the liquid level control chamber 94 so that the overflow open end 98 is a very accurate means by which the liquid level 56 may be maintained.

OPERATION

Due to the fact that the magnets 132 and 144 are magnetically related, the shaft 142 may be rotated to rotate the shaft 14 and the rotor 12 and this may be accomplished either mechanically or manually during the aforementioned charging operation of the housing so that all bubbles and/or air may be released from the pockets 54 of the turbine rotor while a vacuum is applied through the charging tube 86 or when the system is heated to relieve the system of atmospheric gasses or the like. Thus, the charging operation is to include the concurrent rotation of the rotor 12 and either the application of vacuum to the system or the heating thereof, as hereinbefore described.

When the turbine rotor 12 is to be operated to produce shaft horse power at the output shaft 42, the solar heat collector or boiler 52 may be operated either by means of solar energy or by some other waste heat source if desired.

Liquid dichloromethane enters the manifold 124, as hereinbefore described, and partially fills the interior of the boiler between the walls 126 and 128 to approximately 25 to 30 percent of its internal displacement, depending upon engineering requirements relating to environmental use conditions. Thus, when in operation, the volumetric displacement of the interior of the boiler 52 equals 20 to 30 percent of liquid and the remaining portion will be gas in the upper portion of the boiler and in the manifold 130 and this condition will prevail with the liquid level 56 being as shown in FIG. 1 in the housing 10.

As the vaporized or gassious dichloromethane passes from the manifold 130 through the tube 50, it enters the chamber 46 via the opening 48 and passes upwardly into the cavities or pockets 54 at the left side of the horizontal axis 44 and bouyantly uplifts the blades 36 while liquid gravitationally bears down on the blades 36 at the right hand side of the axis 44 and thereby gravitationally exerts torque on the shaft 14 while the bouyant torque is exerted from the left side of the axis 44 by the gas in the pockets or cavities 54 of the rotor 12. The gas eminates upwardly through the liquid at the level 56 and passes upwardly into the condenser 82 as hereinbefore described and the condensate is collected in the sump 90 and transferred to the liquid level control chamber 94 wherein the liquid level 56 is established at the overflow open end 98 of the conduit 96.

The excess liquid above the level 56 passes downwardly through the conduit 96 and into the receiver 114, the outlet of which is controlled by the valve 116 which meters the flow in accordance with the need for smooth gas production and to avoid occillation of the system and the usual problems which are generally known as galloping where the liquid level in the boiler 52 varies and causes a variation of gas production which is relayed to the rotor 12 through the opening 48.

It will be appreciated that the pressure differential between the liquid in the inlet housing 46 and the condensed gas in the condenser 72 is such as to induce the gas in the pockets 54 of the rotor to move rapidly upward and to eminate through the surface 56 of the liquid, while the relatively heavy liquid is moving in a downflow direction as indicated by the arrow 60 and at the right hand side of the axis 44, all as hereinbefore described.

It will be understood that the condenser 72, depending upon whether it is liquid or air cooled, dictates the overall static pressure during operation. Positive static pressure may go as high as 35 PSI when full sunlight is perceived by the collector or boiler 52 and when no cooling whatever is evident in the area of the condenser 72.

With water cooling of the condenser 72, static pressure at the outlet manifold 30 of the boiler 52 may reach 10 to 15 PSI, while within the condenser area, substantially 0 to 5 PSI either pressure or vacuum may be attained depending upon the temperature differential between the interior of the condenser 72 and the outlet manifold 130 of the boiler 52.

In the event the condenser is cooled by fins, as shown in FIG. 4 of the drawings, with thermal air convection internal pressure in the condenser will be higher and may climb substantially into the pressure side. However, overall pressure dictates temperature of condensation and such will occur for so long as the condenser fins 112 are covered to avoid direct sunlight and as long as air is free to circulate by convection between these fins 112.

Under these circumstances, the pressure differential between the boiler 52 and the condenser 72 will be less than water cooling, mechanical conversion of shaft horse power at the shaft 142 will likewise be relatively lower than when the condenser is cooled with a liquid medium.

The valve 116 provides for the return of condensed fluids into the lower manifold 125 of the boiler 52 to prevent fluid oscillation within the boiler 52 and this valve 116, when properly adjusted, will act as a sufficient restriction to produce a damping effect on any tendency of oscillatory operation which may tend to start in the fluid column within the boiler 52.

Static boiler pressure causes the fluid level to be pushed downward and into the reservoir outlet 122 and upwardly through the tube 120 while partial vacuum within the condenser 72 as transmitted to the liquid level control chamber 94 and passage 76 tends to draw fluid upwardly toward the condenser 72 thereby increasing the filling of the reservoir cylinder 114 as energy takeoff at the shaft 142 is increased. The vertical height and length of the boiler 52 and turbine elevation are important and such that when the rotor 12 is locked in stationary position hydrostatic pressure is not sufficient to cause the boiler fluid to go back into the upper part of the housing surrounding the liquid level control chamber 24 and through the downwardly directed tube 100 thereof.

Under such circumstances, any blowback is limited to gasses forcing their way through the liquid seal between the walls of the rotor 12 and the outer housing walls 20 and 22 adjacent to the respective hereinbefore described rotor discs 24 and 26 respectively, and also around the periphery of the outer lips of the semicylindrical blades 36 of the rotor 12.

Differential pressures between the boiler outlet manifold 130 and the interior of the housing above the rotor 12 causes substantial expansion toward the condenser chamber 72 and with liquid sealing as aforementioned causes one half of the rotor system to be relieved of the mere effects of gravitational operation such that one half of the rotor on the right side is subjected to gravitational forces of liquid while the other half of the rotor on the left side, as shown in FIG. 1, is subjected to the gas phase, as hereinbefore set forth.

An alternate method of driving the rotor 12 may become functional if the liquid level in the housing is reduced to approximately the upper level of the cylinder 38 at the central portion of the rotor 12. Under this condition, the gas upthrust comprises one power extraction condition, while the fall from the return duct lip 62 produces another extraction via liquid in the housing. This liquid fall, however, is a gravitational phenomenon and reduces maximum power because, although conversion in the first instance was mostly from gassious thrust with the lowered level condition it required energy to raise the column through the return conduit 68 and deliver the liquid at the lip 62 which is not a requirement when the liquid level is located at 56, as hereinbefore described.

The maximum downward extension of the duct 68 must be such as to prevent, in all cases of loading, any bipass of gasses through this duct in order to thereby avoid gas depletion relative to the hereinbefore described upward travel of gas in the pockets 54 of the rotor 12.

In operation of the rotor 12, it will be understood that the spacing of the blades 36 to form the pockets 54 may have an optimum relationship; as for example, if these blades 36 are spaced too far apart thrust may be lost and there may be a possibility of reverse starting with poor energy conversion. Therefore, if the blades are spaced too far apart, it can be seen that upthrusting gasses can occupy a substantial area within the wheel portion location to the right of the axis 44. In which case, even though the rotor might be started in the proper clockwise rotation as shown in FIG. 1 of the drawings, a counterthrust could be evident to the right of the center line 44.

On the other hand, if the semicircular blades are crowded too close to each other, then sufficient clearing of fluids can suffer because of the time versus gravity factor which again, may cause a drop in the power conversion of the engine.

It will be obvious to those skilled in the art that various modifications may be resorted to without departing from the spirit of the invention.

I claim:

1. A fluid operated turbine having: a housing; liquid in said housing; a rotor rotatably mounted on a horizontal axis and emersed in said liquid in said housing; said rotor provided with a peripheral portion having gas receiving pockets therein; liquid level control means in said housing above said rotor tending to maintain a liquid level above said rotor and adapted to drain overflow liquid from a position above said liquid level whereby said rotor is normally emersed in liquid in said housing; gas inlet means disposed in said housing for introducing a gas phase of said liquid into said housing at the lower periphery of said rotor and at a location horizontally offset from said generally horizontal axis whereby gas is bouyantly introduced into said pockets; said housing provided with arcuate seal and gas passage structure disposed in close tolerance clearance relative to said peripheral portion and pockets of said rotor in an area above said inlet means; said arcuate seal structure having a gas outlet at an upper portion of said rotor above said inlet means; said housing having a liquid downflow conducting arcuate seal structure disposed in close tolerance clearance relative to said peripheral portion and said pockets of said rotor; a liquid outlet disposed in horizontally offset position relative to said axis and communicating with the periphery and pockets of said rotor at a lower portion thereof; said liquid outlet being disposed adjacent said gas inlet in said housing; liquid return conduit means communicating with said liquid outlet and the interior of said housing above said rotor; gas receiving condenser means disposed to receive gas above said liquid level established by said liquid level control means; and baffle and conduit means disposed in intercommunicating relation with said condenser and said housing above said rotor for conducting gas upwardly into said condenser and for shielding said condenser from splashing liquid above said liquid level which may result from gas emanating upwardly through said liquid at said liquid level.

2. The invention as defined in claim 1, wherein: said liquid level control means comprises a control chamber means disposed to receive condensate from said condenser; said control chamber means being disposed below said baffle and conduit means and comprising said liquid level control means.

3. The invention as defined in claim 2, wherein: said chamber means is also provided with a communicating passage means communicating with said liquid in said housing below said liquid level.

4. The invention as defined in claim 1, wherein: said baffle and conduit means comprises a generally horizontal baffle structure in said housing above said rotor outlet; a substantially vertical tube extending upwardly from said horizontal baffle and having a passage therethrough for conducting gasses upwardly into said condenser; said condenser surrounding said last mentioned tube; and a fill tube extending from an upper portion of said condenser downwardly through said tube connected with said baffle; and a seal plug in said fill tube communicating with the exterior of said condenser; said condenser being generally dome shaped and having heat exchange wall structure surrounding said baffle and said tube extending upwardly therefrom.

5. A fluid operated turbine having: a housing; liquid in said housing; a rotor rotatably mounted on a horizontal axis and emersed in said liquid in said housing; said rotor provided with a peripheral portion having gas receiving pockets therein; liquid level control means in said housing above said rotor tending to maintain a liquid level above said rotor and adapted to drain overflow liquid from a position above said liquid level whereby said rotor is normally emersed in liquid in said housing; gas inlet means disposed in said housing for introducing a gas phase of said liquid into said housing at the lower periphery of said rotor and at a location horizontally offset from said generally horizontal axis whereby gas is bouyantly introduced into said pockets; said housing provided with arcuate seal and gas passage structure disposed in close tolerance clearance relative to said peripheral portion and pockets of said rotor in an area above said inlet means; said arcuate seal structure having a gas outlet at an upper portion of said rotor above said inlet means; said housing having a liquid downflow conducting arcuate seal structure disposed in close tolerance clearance relative to said peripheral portion and said pockets of said rotor; a liquid outlet disposed in horizontally offset position relative to said axis and communicating with the periphery and pockets of said rotor at a lower portion thereof; said liquid outlet being disposed adjacent said gas inlet in said housing; liquid return conduit means communicating with said liquid outlet and the interior of said housing above said rotor; gas receiving condenser means disposed to receive gas above said liquid level established by said liquid level control means; a shaft supporting said rotor on said horizontal axis; a magnet carried by said shaft; a second shaft rotatably mounted in said housing and being axially aligned with said first-mentioned shaft; a second magnet mounted on said second shaft in close proximity to the magnet on said first shaft; and a seal diaphragm disposed between said magnets to seal liquid in said housing whereby said first shaft drives said second shaft by means of magnetic flux imparted from said first magnet to said second magnet through said diaphragm.

* * * * *